(12) United States Patent
Tamiya et al.

(10) Patent No.: US 12,463,793 B2
(45) Date of Patent: Nov. 4, 2025

(54) AUTHENTICATION SYSTEM, AUTHENTICATEE APPARATUS, AUTHENTICATOR APPARATUS, AUTHENTICATION METHOD, AND AUTHENTICATION PROGRAM

(71) Applicant: NEC Corporation, Tokyo (JP)

(72) Inventors: Hiroto Tamiya, Tokyo (JP); Toshiyuki Isshiki, Tokyo (JP); Kengo Mori, Tokyo (JP); Haruna Fukuda, Tokyo (JP); Masahiro Nara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 80 days.

(21) Appl. No.: 18/685,575

(22) PCT Filed: Aug. 31, 2021

(86) PCT No.: PCT/JP2021/031917
§ 371 (c)(1),
(2) Date: Feb. 22, 2024

(87) PCT Pub. No.: WO2023/032031
PCT Pub. Date: Mar. 9, 2023

(65) Prior Publication Data
US 2024/0356725 A1    Oct. 24, 2024

(51) Int. Cl.
*H04L 9/06* (2006.01)
*H04L 9/08* (2006.01)

(52) U.S. Cl.
CPC .......... *H04L 9/0618* (2013.01); *H04L 9/0869* (2013.01)

(58) Field of Classification Search
CPC ..... H04L 9/0618; H04L 9/0869; H04L 9/008; H04L 9/32; G06F 21/32
See application file for complete search history.

(56) References Cited

U.S. PATENT DOCUMENTS

2013/0318351 A1* 11/2013 Hirano ............... H04L 9/3231
                                                          713/168
2014/0281567 A1*  9/2014 Rane ................. H04L 9/3231
                                                          713/186
(Continued)

FOREIGN PATENT DOCUMENTS

JP    2016-114692 A    6/2016
JP    2017-130855 A    7/2017
(Continued)

OTHER PUBLICATIONS

International Search Report for PCT Application No. PCT/JP2021/031917, mailed on Nov. 9, 2021.
(Continued)

*Primary Examiner* — El Hadji M Sall
(74) *Attorney, Agent, or Firm* — Sughrue Mion, PLLC (57) ABSTRACT

An authentication system transmits a ciphertext of authentication information from an authenticatee apparatus to an authenticator apparatus using homomorphic encryption with a public key encryption scheme, the authenticator apparatus issues a first random number to the authenticatee apparatus, the authenticatee apparatus generates a second random number and transmits to the authenticator apparatus a first element generated with a public key using the first and the second random numbers and a second element generated with a public key using the second random number, and the authenticator apparatus modifies the second element using the first random number to obtain a ciphertext of the authentication information.

22 Claims, 8 Drawing Sheets

(56) References Cited

U.S. PATENT DOCUMENTS

2016/0173275 A1     6/2016    Yasuda et al.
2020/0322124 A1*   10/2020    Isshiki .................... H04L 9/008

FOREIGN PATENT DOCUMENTS

JP        2019-168590 A    10/2019
WO     2017/170780 A1   10/2017

OTHER PUBLICATIONS

Upmanyu, M., et al., "Blind Authentication: A Secure Crypto-Biometric Verification Protocol", IEEE Transactions on Information Forensics and Security. Jun. 2010, vol. 5 No. 2, pp. 255-268, II. Blind Authentication.

Im, J-H., et al., "Practical Privacy-Preserving Face Authentication for Smartphones Secure Against Malicious Clients", IEEE Transactions on Information Forensics and Security. 2020, vol. 15, pp. 2386-2401, IV. Proposed Methods.

* cited by examiner

AUTHENTICATION SYSTEM, AUTHENTICATEE APPARATUS, AUTHENTICATOR APPARATUS, AUTHENTICATION METHOD, AND AUTHENTICATION PROGRAM

This application is a National Stage Entry of PCT/JP2021/031917 filed on Aug. 31, 2021, the contents of all of which are incorporated herein by reference, in their entirety.

FIELD

The present invention relates to an authentication system, authenticatee apparatus, authenticator apparatus, authentication method, and authentication program.

BACKGROUND

Biometric authentication is an example of identity verification. It is an identity verification technique that verifies the identity of an authenticatee by comparing the biometric information of the authenticatee. Here, the "biometric information" is data extracted from some characteristics of an individual with respect to his or her body and behavior. For instance, the biometric information includes extracted features from images such as fingerprints or palm prints, as well as features extracted from audio data like voiceprints.

In biometric authentication, the biometric information of an authenticatee is registered in advance, and at the time of authentication, it is verified whether or not the registered biometric information and the biometric information of the authenticatee match. In this case, the biometric information must be managed with advanced security, and it is preferable to perform the verification of whether the registered biometric information matches that of the authenticatee in an encrypted form.

Homomorphic encryption is an encryption scheme that satisfies such demands. The homomorphic encryption scheme possesses homomorphism, and one can perform a computation on a ciphertext, which is the result of an operation between plaintexts decrypted from ciphertexts, without decrypting it. Homomorphic encryption allows calculating the similarity between the features of registered biometric information and those of the biometric information of an authenticatee while keeping the data in encrypted form. The similarity of features is determined by using measures such as the squared Euclidean distance or inner product between the features, and when these values fall within a predetermined range, it can be concluded that the registered biometric information matches that of the authenticatee.

PATENT LITERATURE 1

Japanese Patent Kokai Publication No. JP-P2016-114692A

SUMMARY

The disclosure of the literature in Citation List above is incorporated herein in its entirety by reference thereto. The following analysis is given by the present inventors.

In an authentication scheme using homomorphic encryption, encrypted biometric information is sent and received, however, there is a risk of a "replay attack," also known as "spoofing," being carried out. In a replay attack, a malicious attacker intercepts authentication information sent by a legitimate authenticatee to an authentication apparatus and then resends the information to the authentication apparatus as if it were their own. The malicious attacker cannot decrypt the intercepted authentication information, but since the encrypted authentication information is legitimate, the attacker can be successfully authenticated.

To address such replay attacks, there is a known authentication method called "challenge-response." In challenge-response authentication, the authenticator issues a unique challenge for each authentication attempt, and the authenticatee is then required to provide a response corresponding to this challenge. Since challenge-response authentication issues a unique challenge-response pair for each authentication session, a malicious attacker cannot simply resend to the authenticator a response intercepted in the past and expect to be authenticated successfully.

In a case of authentication using homomorphic encryption, similarity calculation using a homomorphic operation follows a challenge-response phase. Therefore, the response should be sent with the challenge embedded therein so that the authenticator can convert in post-processing the response to the ciphertext that the authenticatee originally intends to send. For instance, Patent Literature 1 describes a challenge-response authentication scheme in which a received challenge is embedded in a plaintext using the homomorphism of homomorphic encryption and the plaintext is sent as a response. The method described in Patent Literature 1 utilizes the fact that only those who know the plaintext can perform pseudo division using inverse element calculation and homomorphic multiplication in the plaintext space.

As described above, in a challenge-response scheme in authentication using homomorphic encryption, the challenge-response and homomorphic encryption schemes are closely related. Therefore, the method described in Patent Literature 1 is not necessarily the optimal method for all homomorphic encryption schemes. Depending on the homomorphic encryption scheme used, it may be possible to improve factors such as communication volume and computational complexity by employing a method different from the one described in Patent Literature 1. In other words, if there are more types of challenge-response protocols that can be used in authentication with homomorphic encryption, it becomes possible to select and use the most suitable challenge-response protocol according to the homomorphic encryption scheme being employed.

In view of the problem above, it is an object of the present invention to provide an authentication system, authenticatee apparatus, authenticator apparatus, authentication method, and authentication program that contribute to security against replay attacks.

According to a first aspect of the present invention, there is provided an authentication system transmitting a ciphertext of authentication information from an authenticatee apparatus to an authenticator apparatus using homomorphic encryption with a public key encryption scheme, wherein the authenticator apparatus issues a first random number to the authenticatee apparatus, the authenticatee apparatus generates a second random number and transmits to the authenticator apparatus a first element generated with a public key using the first and the second random numbers and a second element generated with a public key using the second random number, and the authenticator apparatus modifies the second element using the first random number to obtain a ciphertext of the authentication information.

According to a second aspect of the present invention, there is provided an authenticatee apparatus transmitting to an authenticator apparatus a ciphertext of authentication information using homomorphic encryption with a public key encryption scheme, wherein the authenticatee apparatus receives a first random number from the authenticator apparatus, generates a second random number, and transmits to the authenticator apparatus a pair of a first element generated with a public key using the first and the second random numbers and a second element generated with a public key using the second random number so that the authenticator apparatus obtains a ciphertext of the authentication information by modifying the second element using the first random number.

According to a third aspect of the present invention, there is provided an authenticator apparatus receiving from an authenticatee apparatus a ciphertext of authentication information using homomorphic encryption with a public key encryption scheme, wherein the authenticator apparatus issues a first random number to the authenticatee apparatus, which generates a second random number, receives from the authenticatee apparatus a first element generated with a public key using the first and the second random numbers and a second element generated with a public key using the second random number, and modifies the second element using the first random number to obtain a ciphertext of the authentication information.

According to a fourth aspect of the present invention, there is provided an authentication method transmitting a ciphertext of authentication information from an authenticatee apparatus to an authenticator apparatus using homomorphic encryption with a public key encryption scheme, the authentication method including: having the authenticator apparatus issue a first random number to the authenticatee apparatus; having the authenticatee apparatus generate a second random number and transmit to the authenticator apparatus a first element generated with a public key using the first and the second random numbers and a second element generated with a public key using the second random number; and having the authenticator apparatus modify the second element using the first random number to obtain a ciphertext of the authentication information.

According to a fifth aspect of the present invention, there is provided an authentication program transmitting a ciphertext of authentication information from an authenticatee apparatus to an authenticator apparatus using homomorphic encryption with a public key encryption scheme, the authentication program including: having the authenticator apparatus issue a first random number to the authenticatee apparatus; having the authenticatee apparatus generate a second random number and transmit to the authenticator apparatus a first element generated with a public key using the first and the second random numbers and a second element generated with a public key using the second random number; and having the authenticator apparatus modify the second element using the first random number to obtain a ciphertext of the authentication information. Further, this program can be stored in a computer-readable storage medium. The storage medium may be a non-transient one such as a semiconductor memory, a hard disk, a magnetic recording medium, an optical recording medium, and the like. The present invention can also be realized as a computer program product.

According to each aspect of the present invention, it becomes possible to provide an authentication system, authenticatee apparatus, authenticator apparatus, authentication method, and authentication program that contribute to security against replay attacks.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
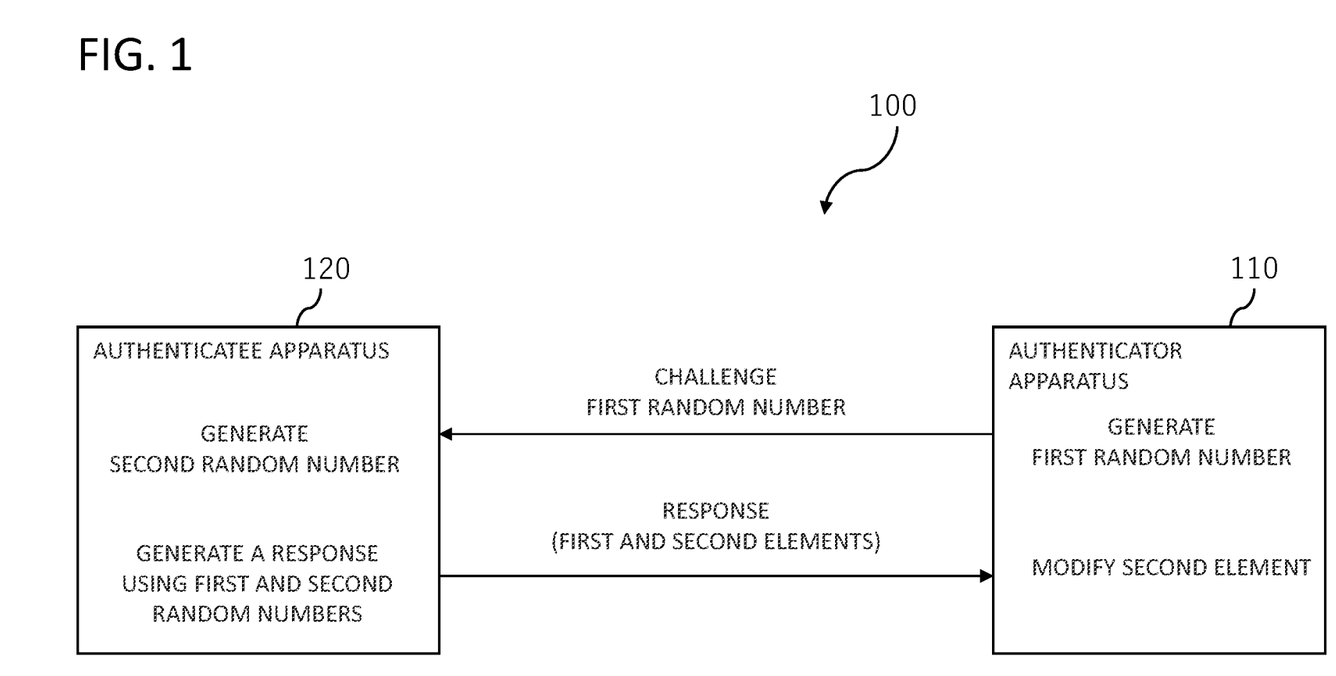
FIG. 1 is a drawing showing a schematic configuration of an authentication system relating to a first example embodiment.

The following describes an authentication system relating to a first example embodiment with reference to FIG. 1. In the first example embodiment, the basic concept common to each example embodiment discussed later will be described.

FIG. 1 is a drawing showing a schematic configuration of an authentication system relating to the first example embodiment. As shown in FIG. 1, the authentication system 100 comprises an authenticator apparatus 110 and an authenticatee apparatus 120, and transmits a ciphertext of authentication information from the authenticatee apparatus 120 to the authenticator apparatus 110 using homomorphic encryption with a public key encryption scheme.

The authenticator apparatus 110 and the authenticatee apparatus 120 are information processing apparatuses (computers), the hardware configurations of which will be described using an example later. The authenticator apparatus 110 and the authenticatee apparatus 120 may be connected by wired or wireless communication. For instance, the authenticatee apparatus 120 may be a general-purpose personal computer or a mobile terminal such as a smartphone.

Alternatively, the authenticatee apparatus 120 may also be configured as part of a different apparatus that requires authentication, such as a cash dispenser.

The authenticator apparatus 110 generates a first random number and transmits it to the authenticatee apparatus 120. A challenge sent from the authenticator apparatus 110 to the authenticatee apparatus 120 includes at least this first random number. In other words, the authenticator apparatus 110 newly generates a first random number for each challenge-response session between the authenticator apparatus 110 and the authenticatee apparatus 120.

The authenticatee apparatus 120 receives the first random number from the authenticator apparatus 110 and generates a second random number different from the first random number. Then, the authenticatee apparatus 120 generates a response to the challenge by combining the first and the second random numbers and transmits the response to the authenticator apparatus 110. As described later, this response indirectly includes authentication information.

The authenticatee apparatus 120 includes the authentication information in a pair of first and second elements and transmits it to the authenticator apparatus 110. Note that the first element is generated with a public key using the first and the second random numbers whereas the second element is generated with a public key using the second random number. It should be further noted that the first and the second elements are encrypted by using different random numbers in this case. If the first and the second elements were encrypted by using the same random number, then the pair of the first and the second elements would be an ordinary ciphertext of the authentication information.

Meanwhile, from the authenticatee apparatus 120, the authenticator apparatus 110 receives the pair of the first and the second elements, which is not a direct ciphertext of the authentication information, as stated above. If this is a normal ciphertext, it is possible to perform subsequent processing on the ciphertext using homomorphic operations, but the received response is not a normal ciphertext. Therefore, the authenticator apparatus 110 modifies the second element using the first random number and obtains a ciphertext of the authentication information. The authenticator apparatus 110 also holds the first random number since it was generated by the authenticator apparatus 110. Therefore, using the first random number, the authentication apparatus 110 modifies the second element generated with the public key using the second random number to a value that would have been obtained if it had been generated with the public key using both the first and the second random numbers.

As described, by modifying the received response, the authenticator apparatus 110 is able to obtain a ciphertext of the authentication information that would have been obtained if it had been generated with the public key using the first and the second random numbers. In other words, through the exchange of challenge-response, it becomes possible for the authenticatee apparatus 120 to transmit the ciphertext of the authentication information to the authenticator apparatus 110. Further, this ciphertext of the authentication information is a genuine, normal ciphertext to which a homomorphic operation can be applied, allowing subsequent processing to be performed thereon while it remains encrypted.

The response transmitted from the authenticatee apparatus 120 to the authenticator apparatus 110 indirectly includes the authentication information, and the first element in the response was generated by using the first and the second random numbers. This first random number is a random number newly generated for each challenge-response session. If an attacker intercepts a response sent from the authenticatee apparatus 120 to the authenticator apparatus 110 and resends the intercepted response to the authenticator apparatus 110 without changing it, the authentication will not be successful since the first random numbers don't match. In other words, the authentication system 100 relating to the first example embodiment is able to contribute to resistance against replay attacks.

Verification Method

Figure 2:
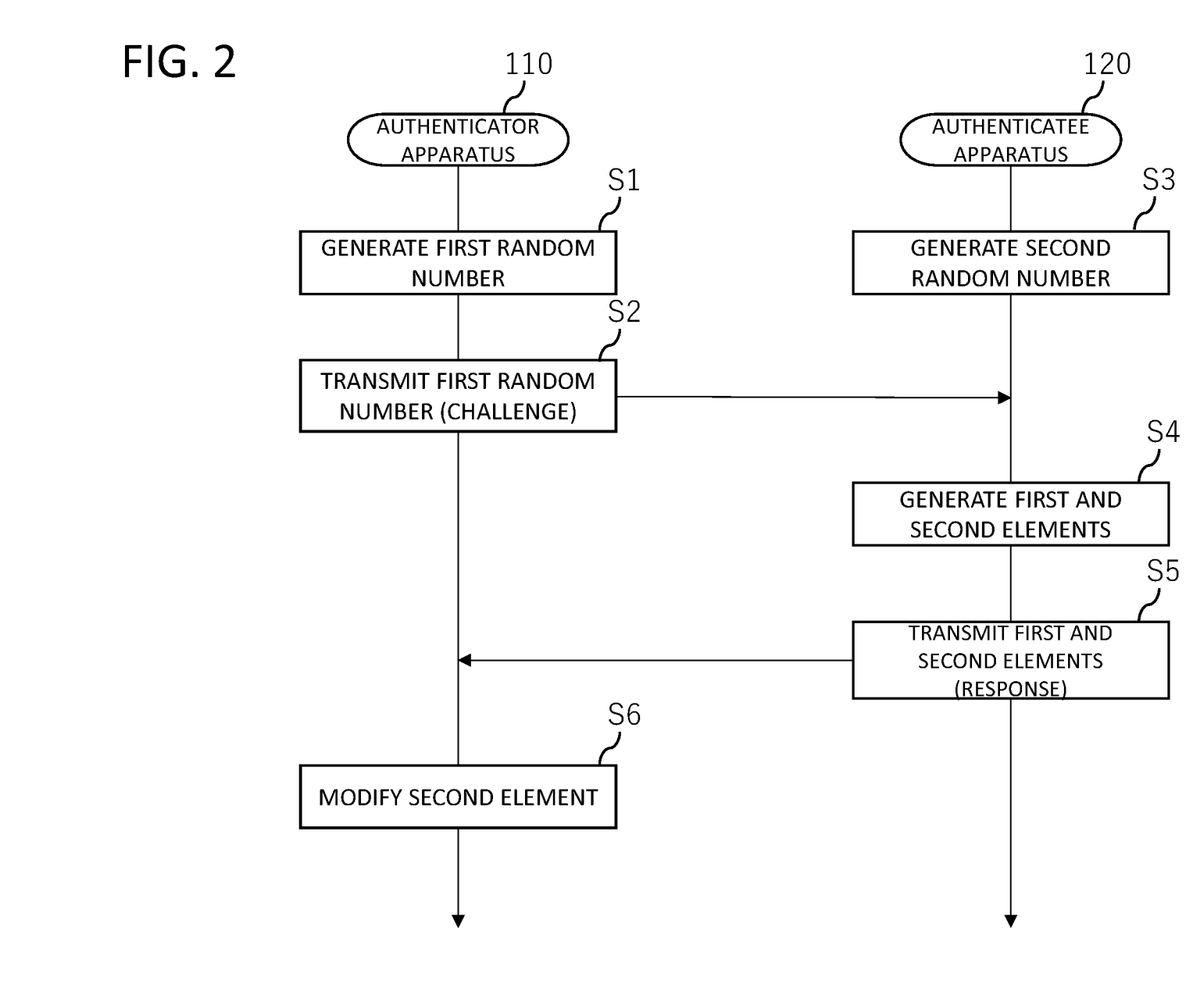
FIG. 2 is a system flow diagram showing an outline of the procedure of an authentication method relating to the first example embodiment.

FIG. 2 is a system flow diagram showing an outline of the procedure of an authentication method relating to the first example embodiment. The system flow shown in FIG. 2 can be achieved by using the authentication system 100 described above, for instance.

As shown in FIG. 2, the authentication method relating to the first example embodiment is performed between the authenticator apparatus 110 and the authenticatee apparatus 120, which transmits a ciphertext of authentication information to the authenticator apparatus 110 using homomorphic encryption with a public key encryption scheme.

First, the authenticator apparatus 110 generates a first random number (step S1) and transmits it to the authenticatee apparatus 120 (step S2). A challenge sent from the authenticator apparatus 110 to the authenticatee apparatus 120 includes at least this first random number.

Meanwhile, the authenticatee apparatus 120 generates a second random number different from the first random number (step S3).

Then, the authenticatee apparatus 120 generates a first element with a public key using the first and the second random numbers and further generates a second element with a public key using the second random number (step S4).

The authenticatee apparatus 120 pairs up the first and the second elements thus generated and transmits the pair as a response to the authenticator apparatus 110 (step S5). Note that, as stated above, if the first and the second elements were encrypted using the same random number, the pair of the first and the second elements would be a normal ciphertext of authentication information. However, since the first and the second elements are encrypted using different random numbers, the response sent from the authenticatee apparatus 120 to the authenticator apparatus 110 is not a direct ciphertext of the authentication information.

Then, the authenticator apparatus 110 modifies the second element using the first random number to obtain a ciphertext of the authentication information (step S6). The authenticator apparatus 110 also holds the first random number since it was generated by the authenticator apparatus 110. Therefore, using the first random number, the authentication apparatus 110 modifies the second element generated with the public key using the second random number to a value that would have been obtained if it had been generated with the public key using the first and the second random numbers.

According to the procedure above, the authentication method relating to the first example embodiment is also able to transmit the ciphertext of the authentication information from the authenticatee apparatus 120 to the authenticator apparatus 110 through the exchange of challenge-response.

Figure 3:
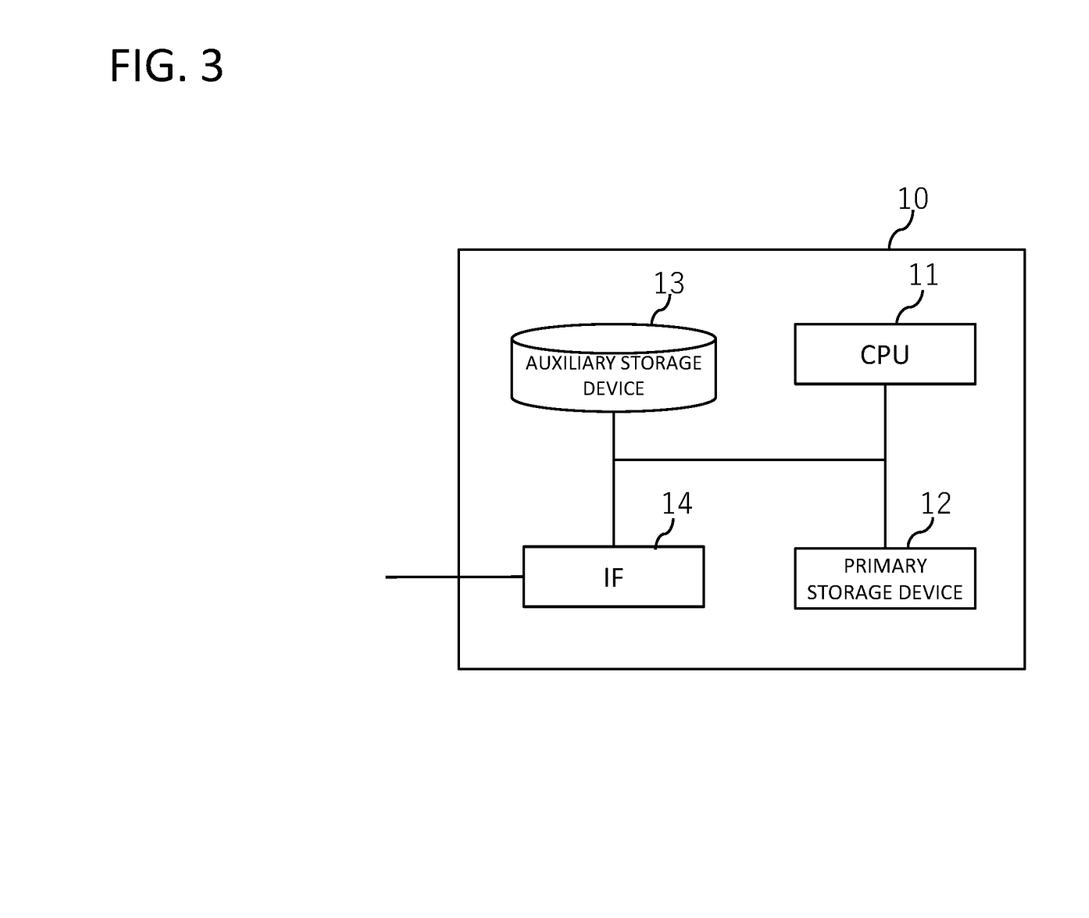
FIG. 3 is a drawing showing an example of the hardware configuration of an authenticator apparatus and an authenticatee apparatus.

(Hardware Configuration) FIG. 3 is a drawing showing an example of the hardware configuration of the authenticator apparatus and the authenticatee apparatus.

An information processing apparatus (computer) employing the hardware configuration shown in FIG. 3 can achieve the functions of the authenticator apparatus 110 and the authenticatee apparatus 120 by executing the authentication method described above as a program. It should be noted that the hardware configuration example shown in FIG. 3 is merely an example of the hardware configuration that achieves the functions of the authenticator apparatus 110 and the authenticatee apparatus 120 and is not intended to limit the hardware configuration of the authenticator apparatus 110 and the authenticatee apparatus 120. The authenticator apparatus 110 and the authenticatee apparatus 120 may include hardware not shown in FIG. 3.

As shown in FIG. 3, the hardware configuration 10 that may be employed by the authenticator apparatus 110 and the authenticatee apparatus 120 comprises a CPU (Central Processing Unit) 11, a primary storage device 12, an auxiliary storage device 13, and an IF (interface) part 14, which are connected to each other by, for instance, an internal bus.

The CPU 11 executes each instruction included in the authentication program executed by the authenticator apparatus 110 and the authenticatee apparatus 120. The primary storage device 12 is, for instance, a RAM (Random Access Memory) and temporarily stores various programs such as the authentication program executed by the authenticator apparatus 110 and the authenticatee apparatus 120 so that the CPU 11 can process the programs.

The auxiliary storage device 13 is, for instance, an HDD (Hard Disk Drive) and is capable of storing the various programs, such as the authentication program executed by the authenticator apparatus 110 and the authenticatee apparatus 120, in the medium to long term. The various programs such as the authentication program may be provided as a program product stored in a non-transitory computer-readable storage medium. The auxiliary storage device 13 can be used to store the various programs such as the authentication program stored in the non-transitory computer-readable storage medium in the medium to long term. The IF part 14 provides an interface to the input and output between, for instance, the authenticator apparatus 110 and the authenticatee apparatus 120.

The information processing apparatus employing the hardware configuration 10 described above achieves the functions of the authenticator apparatus 110 and the authenticatee apparatus 120 by executing the authentication method described above as a program.

Second Example Embodiment

Next, an example embodiment of the present invention based on a specific encryption scheme will be described. The encryption scheme used in the following description takes advantage of the difficulty of solving a problem called the Ring-LWE (RLWE) problem. Therefore, first, we will explain the Ring-LWE (RLWE) problem.

As preparation, let $Z[X]$ be a set of all integer coefficient polynomials, and let $R=Z[X]/(x^n+1)$ be a ring formed by a set of polynomials representing the remainders when $Z[X]$ is divided by $x^n+1$ ($x^n=-1$), where n is a power of two. Further, let $R_q=R/qR$ be a ring formed by a set of polynomials obtained by dividing each coefficient of the polynomials included in R by q, which is a prime number that satisfies q=1 mod 2n.

Sampling is defined as follows:
$a_i \leftarrow^R R_q$: Uniformly select $a_i$ from $R_q$ at random.
$s \leftarrow \chi_s$: Sample s according with a distribution $\chi_s$ over $R_q$.
$e_i \leftarrow \chi_s$: Sample $e_i$ according with the distribution $\chi_s$ over $R_q$.

At this time, the problem of finding s when given $(a_i, b_i=a_i s+e_i) \in R_q \times R_q$ is referred to as the Search RLWE problem.

Further, the problem of determining whether $b_i=a_i s+e_i$ or $a_i \leftarrow^R R_q$ when given $(a_i, b_i) \in R_q \times R_q$ is called the Decision RLWE problem.

Both the Search and Decision RLWE problems are considered difficult to solve, and cryptographic schemes based on this difficulty are known. Note that $b_i$ is referred to herein as the RLWE instance.

(The BGV Encryption Scheme)

The BGV encryption scheme is one of the cryptographic schemes that take advantage of the difficulty of the Search and Decision RLWE problems.

In the BGV encryption scheme, the following parameters are prepared. Let n be a power of two, and define a ring $R=Z[X]/(x^n+1)$ for this n. Then, for a prime number q satisfying q=1 mod 2n, define a ciphertext space ring $R_q=R/qR$. Also, for an integer t satisfying t<q, define a plaintext space ring $R_t=R/qR$. Further, when the standard deviation of a discrete Gaussian distribution that provides noise is $\alpha$, let $\chi=D_z^n{}_{,\sigma}$ be an element of the ring R where each coefficient follows a discrete Gaussian distribution with mean 0 and variance $\sigma^2$.

Keys are generated as follows. Sample s, e according with the distribution $\chi$ (s, e$\leftarrow\chi$) and generate $p_1 \in R_q$ uniformly at random. Using these, we define a public key as pk=($p_0$, $p_1$)=($-(p_1 s+te)$, $p_1$)$\in (R_q)^2$ and a secret key as sk=s.

Then, encryption is performed as follows. Generate u, f, g$\Theta\chi$ according with the distribution X for a plaintext m$\in R_q$ and the public key pk=($p_0$, $p_1$), and construct a ciphertext ct=($c_0$, $c_1$)=($p_0 u+tg+m$, $p_1 u+tf$)$\in (R_q)^2$.

For the ciphertext thus defined, homomorphic addition and homomorphic multiplication are defined.

Homomorphic Addition: For ciphertexts ct and ct', homomorphic addition ct" is defined as follows:

[Math. 1]

$$ct = (c_0, c_1, \ldots, c_\xi), ct' = (c'_0, c'_1, \ldots, c'_\eta)$$

$$ct''(z) = ct(z) + ct'(z) = \sum_{i=0}^{max(\xi,\eta)} (c_i + c'_i)z^i \in (R_q)^{max(\xi,\eta)}$$

Homomorphic Multiplication: For the ciphertexts ct and ct', homomorphic multiplication ct" is defined as follows. Note that ($c_0 c_0'$, $c_0 c_1'+c_0' c_1$, $c_1 c_1'$) when ct=($c_0$, $c_1$), ct'=($c_0'$, $c_1'$). It is important to note that performing homomorphic multiplication increases the elements of the ciphertext.

[Math. 2]

$$ct = (c_0, c_1, \ldots, c_\xi), ct' = (c'_0, c'_1, \ldots, c'_\eta)$$

$$ct''(z) = ct(z) + ct'(z) = \left(\sum_{i=0}^{\xi} c_i z^i\right)\left(\sum_{i=0}^{\eta} c'_i z^i\right) \in (R_q)^{\xi+\eta+1}$$

Meanwhile, the ciphertext above can be decrypted by performing the following process:

Decryption: The ciphertext ct can be decrypted into the plaintext m as follows. Note that $[\ ]_q$ is a reduction to $[-q/2, q/2)$; ct(s)=$c_0+c_1 s$ when ct=($c_0$, $c_1$); and ct(s)=$c_0+c_1 s+c_2 s^2$ when ct=($c_0$, $c_1$, $c_2$).

[Math. 3]

$$ct = (c_0, c_1, \ldots, c_\xi)$$

$$m = [ct(s)]_q \bmod t = \left[\sum_{i=0}^{\xi} c_i s^i\right]_q \bmod t \in R_t$$

Figure 4:
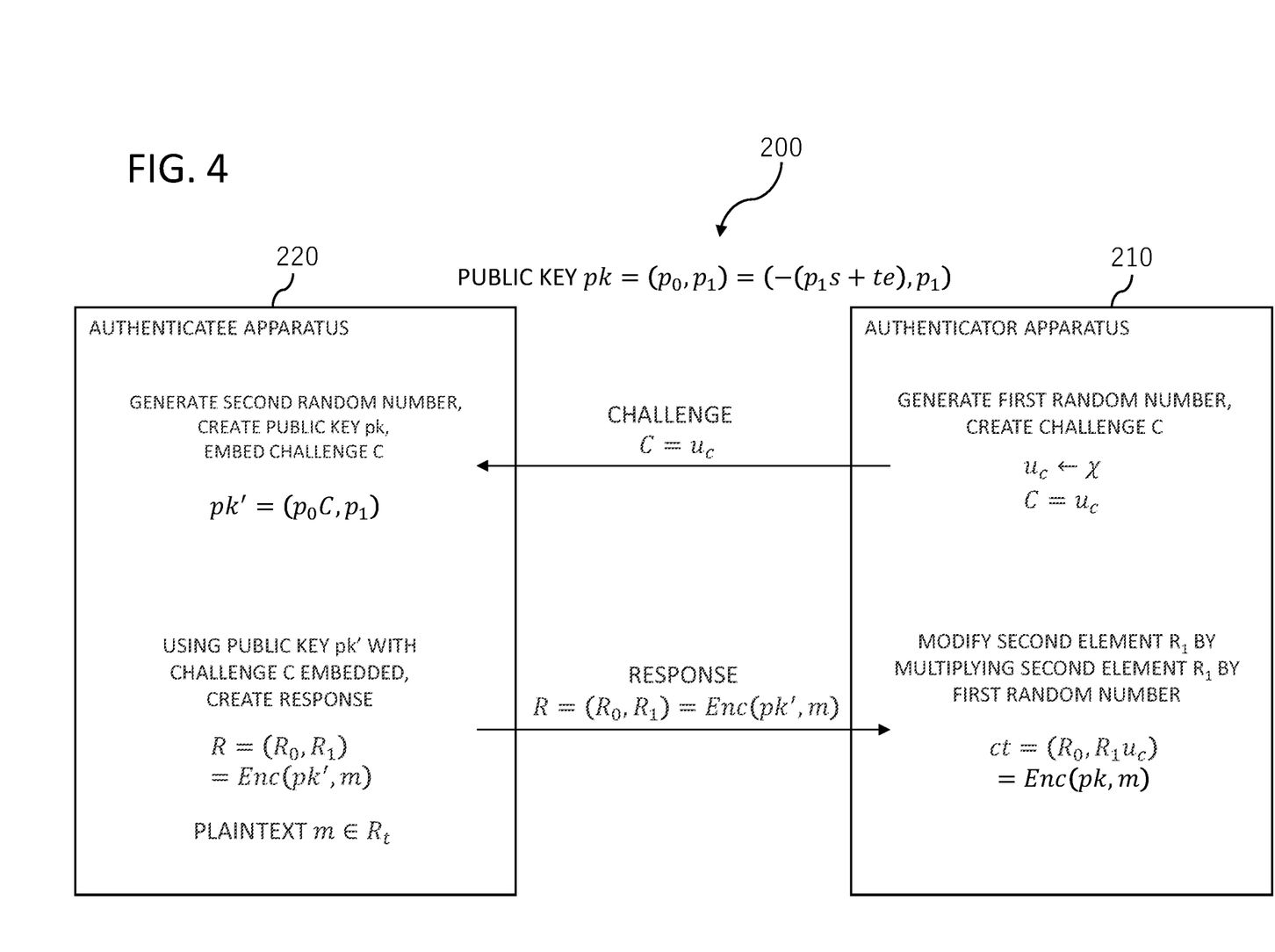
FIG. 4 is a drawing showing a schematic configuration of an authentication system relating to a second example embodiment.

FIG. 4 is a drawing showing a schematic configuration of an authentication system relating to the second example embodiment. The authentication system 200 relating to the second example embodiment shown in FIG. 4 uses the BGV encryption scheme. As shown in FIG. 4, the authentication system 200 comprises an authenticator apparatus 210 and an authenticatee apparatus 220, and transmits a ciphertext of authentication information from the authenticatee apparatus 220 to the authenticator apparatus 210 using homomorphic encryption with a public key encryption scheme.

The authenticator apparatus 210 generates a first random number ($u_c \leftarrow \chi$) and creates a challenge $C=u_c$ using this first random number. Then, the authenticator apparatus 210 transmits the challenge $C=u_c$ to the authenticatee apparatus 220.

Meanwhile, the authenticatee apparatus 220 generates a second random number and creates a public key pk using this second random number. Here, the public key pk is pk=($p_0$, $p_1$)=($-(p_1s+te)$, $p_1$)∈$(R_q)^2$ as defined in the BGV encryption scheme. Then, the authenticatee apparatus 220 embeds the challenge $C=u_c$ received from the authenticator apparatus 210 into the public key pk to create a pseudo public key pk'=($p_0C$, $p_1$).

The authenticatee apparatus 220 pseudo-encrypts a plaintext m∈$R_t$ using the pseudo public key pk'=($p_0C$, $p_1$) with the challenge $C=u_c$ embedded therein. Here, pseudo-encryption means performing the same process of encryption as in the normal BGV encryption scheme using the pseudo public key pk'=($p_0C$, $p_1$) with the challenge $C=u_c$ embedded therein. In other words, the authenticatee apparatus 220 calculates a response R=($R_0$, $R_1$)=Enc(pk', m). Then, the authenticatee apparatus 220 transmits this response R=($R_0$, $R_1$)=Enc(pk', m) to the authenticator apparatus 210.

The authenticator apparatus 210 receives the response R=($R_0$, $R_1$)=Enc(pk', m) from the authenticatee apparatus 220. As stated above, since this was created with the pseudo public key pk'=($p_0C$, $p_1$), it is not a direct ciphertext of the plaintext m∈$R_t$. Then, the authenticator apparatus 210 modifies the second element $R_1$ of the received response R=($R_0$, $R_1$) to obtain a ciphertext of the plaintext m∈$R_t$.

More concretely, the authenticator apparatus 210 multiplies the second element $R_1$ of the received response R=($R_0$, $R_1$) by the first random number $u_c$. ct=($R_0$, $R_1 u_c$) obtained by multiplying the second element $R_1$ by the first random number $u_c$ matches the ciphertext obtained by encrypting the plaintext m∈$R_t$ using the public key pk=($p_0$, $p_1$)=($-(p_1s+te)$, $p_1$). This can be confirmed by performing the following calculations:

[Math. 4]

$$R_0 = Cu + tg + m =$$
$$(p_0u_c + te_c)u + tg + m = p_0u_cu + t(e_cu + g) + m = p_0u' + tg' + m$$
$$R_1u_c = (p_1u + tf)u_c = p_1u_cu + tfu_c = p_1u' + tf'$$
$$\therefore ct = Enc(pk, m)$$

As described, through the exchange of challenge-response, it becomes possible for the authenticator apparatus 210 to have a ciphertext of authentication information transmitted from the authenticatee apparatus 220 to the authenticator apparatus 210.

Further, the security against replay attacks in the authentication system 200 relating to the second example embodiment can be explained as follows:

In order to generate a response R' corresponding to a new challenge C' from the challenge C' and a pair of a challenge C and a response R that succeeded in a past authentication session, an attacker must replace $p_0u_cu$ included in $R_0=p_0u_cu+t(e_cu+g)+m$, one of the elements in the response R that was successfully authenticated in the past, with a monomial $p_0u_c'u$ corresponding to the new challenge C'.

However, although the attacker can calculate $p_0u_c$ from the challenge $C=u_c$ and the public key $p_0$, they cannot determine the value of u (if the attacker could determine u, they would be breaking the one-wayness of BGV). Therefore, the attacker cannot calculate $p_0u_cu$ and remove it from $R_0$.

Further, if the attacker manages to obtain the new challenge $C'=u_c'$, they may be able to create a response corresponding to the new challenge as R'=($R_0$, $R_1/u_c'$=(($p_1u+tf$)/$u_c'$). However, since $R_t$ is a ring, division is not defined. Note that, since there are cases where it can be calculated, one might consider limiting the noise generated in the challenge to those that do not have inverse elements.

In the end, it is demonstrated that the attacker cannot forge a response R' corresponding to the new challenge C' and that the authentication system 200 relating to the second example embodiment is secure against replay attacks.

Third Example Embodiment

Figure 5:
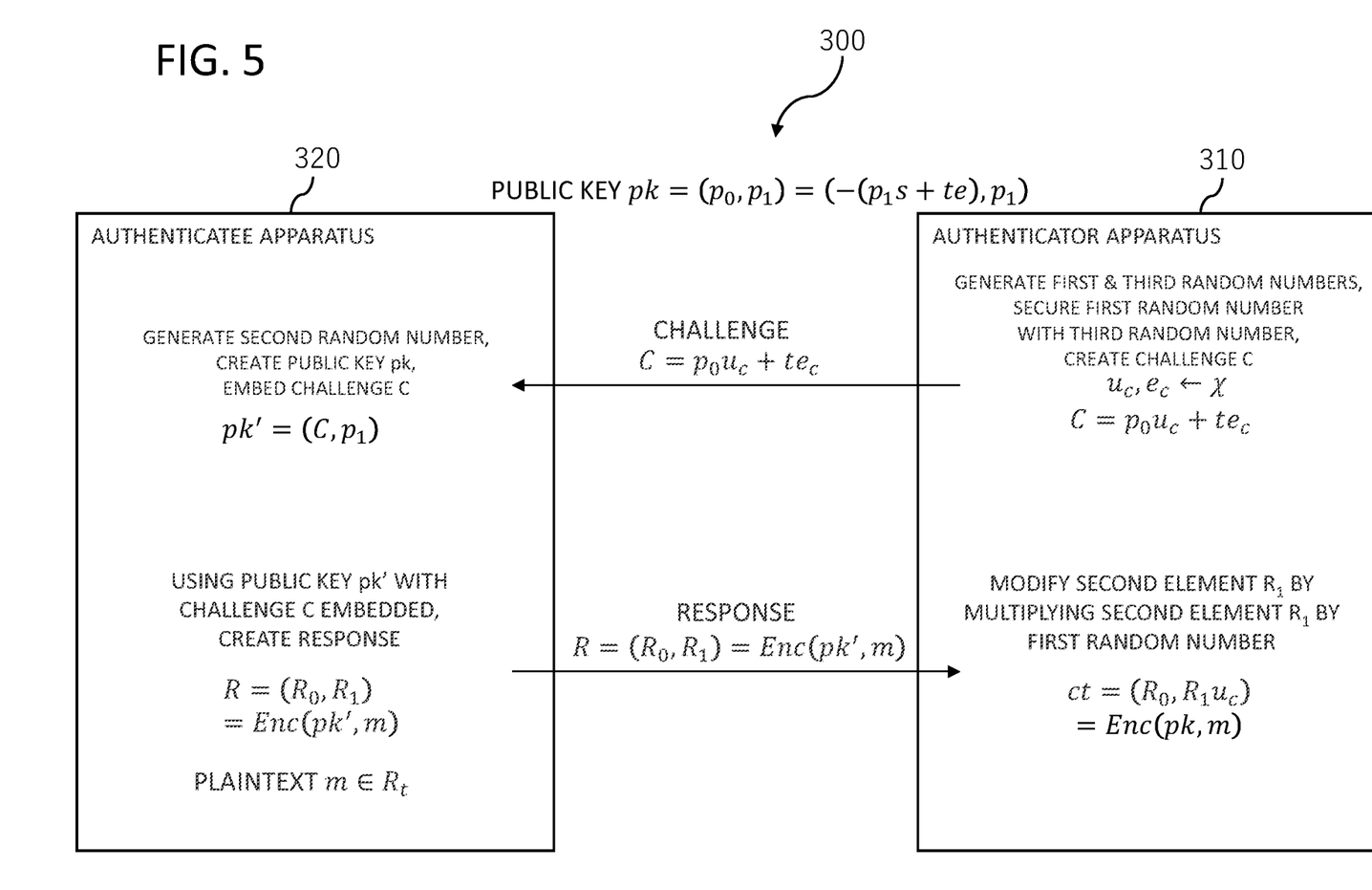
FIG. 5 is a drawing showing a schematic configuration of an authentication system relating to a third example embodiment.

FIG. 5 is a drawing showing a schematic configuration of an authentication system relating to a third example embodiment. In the authentication system 300 relating to the third example embodiment shown in FIG. 5, a configuration to secure the first random number is added to the second example embodiment using the BGV encryption scheme. As shown in FIG. 5, the authentication system 300 comprises an authenticator apparatus 310 and an authenticatee apparatus 320, and transmits a ciphertext of authentication information from the authenticatee apparatus 320 to the authenticator apparatus 310 using homomorphic encryption with a public key encryption scheme.

The authenticator apparatus 310 generates first and third random numbers ($u_c$, $e_c \leftarrow \chi$) and secures the first random number using the third random number to create a challenge $C=p_0u_c+te_c$. Then, the authenticator apparatus 310 transmits the challenge $C=p_0u_c+te_c$ to the authenticatee apparatus 320.

Meanwhile, the authenticatee apparatus 320 generates a second random number and creates a public key pk using this second random number. Here, the public key pk is pk=($p_0$, $p_1$)=($-(p_1s+te)$, $p_1$)∈$(R_q)^2$ as defined in the BGV encryption scheme. Then, the authenticatee apparatus 320 embeds the challenge $C=p_0u_c+te_c$ received from the authenticator apparatus 310 into the public key pk to create a pseudo public key pk'=(C, $p_1$).

The authenticatee apparatus 320 pseudo-encrypts a plaintext m∈$R_t$ using the pseudo public key pk'=(C, $p_1$) with the challenge $C=p_0u_c+te_c$ embedded therein. Here, pseudo-encryption means performing the same process of encryption as in the normal BGV encryption scheme using the pseudo public key pk'=(C, $p_1$) with the challenge $C=p_0u_c+te_c$ embedded therein. In other words, the authenticatee apparatus 320 calculates a response R=($R_0$, $R_1$)=Enc(pk', m). Then, the authenticatee apparatus 320 transmits this response R=($R_0$, $R_1$)=Enc(pk', m) to the authenticator apparatus 310.

The authenticator apparatus 310 receives the response R=($R_0$, $R_1$)=Enc(pk', m) from the authenticatee apparatus 320. As stated above, since this was created with the pseudo public key pk'=(C, $p_1$), it is not a direct ciphertext of the plaintext $m \in R_t$. Then, the authenticator apparatus 310 modifies the second element $R_1$ of the received response $R=(R_0, R_1)$ to obtain a ciphertext of the plaintext $m \in R_t$.

More concretely, the authenticator apparatus 310 multiplies the second element $R_1$ of the received response $R=(R_0, R_1)$ by the first random number $u_c$. $ct=(R_0, R_1 u_c)$ obtained by multiplying the second element $R_1$ by the first random number $u_c$ matches the ciphertext obtained by encrypting the plaintext $m \in R_t$ using the public key $pk=(p_0, p_1)=(-(p_1 s+te), p_1)$. This can be confirmed by performing the following calculations:

[Math. 5]

$$R_0 = Cu + tg + m =$$
$$(p_0 u_c + te_c)u + tg + m = p_0 u_c u + t(e_c u + g) + m = p_0 u' + tg' + m$$
$$R_1 u_c = (p_1 u + tf)u_c = p_1 u_c u + tfu_c = p_1 u' + tf'$$
$$\therefore ct = Enc(pk, m)$$

As described, through the exchange of challenge-response, it becomes possible for the authenticator apparatus 310 to have a ciphertext of authentication information transmitted from the authenticatee apparatus 320 to the authenticator apparatus 310.

Further, with the first random number secured, the authentication system 300 relating to the third example embodiment provides increased security against replay attacks, as explained below.

In order to generate a response R' corresponding to a new challenge C' from the challenge C' and a pair of a challenge C and a response R that succeeded in a past authentication session, an attacker must replace $p_0 u_c u$ included in $R_0 = p_0 u_c u + t(e_c u + g) + m$, one of the elements in the response R that was successfully authenticated in the past, with $p_0 u_c' u$ corresponding to the new challenge C'.

However, although the attacker can obtain the challenge $C = p_0 u_c + te_c$, they cannot determine the value of u (if the attacker could determine u, they would be breaking the one-wayness of BGV). Therefore, the attacker cannot calculate $p_0 u_c u$ and remove it from $R_0$.

In the end, it is demonstrated that the attacker cannot forge a response R' corresponding to the new challenge C' and that the authentication system 300 relating to the third example embodiment is secure against replay attacks.

Fourth Example Embodiment

A fourth example embodiment utilizes the BFV encryption scheme, which is another encryption scheme based on the Ring-LWE (RLWE) problem. Since the Ring-LWE (RLWE) problem has been already discussed, the following explains the BFV encryption scheme.

In the BFV encryption scheme, the following parameters are prepared. Let n be a power of two, and define a ring $R = Z[X]/(x^n + 1)$ for this n. Then, for a prime number q satisfying $q = 1 \mod 2n$, define a ciphertext space ring $R_q = R/qR$. Also, for an integer t satisfying $t < q$, define a plaintext space ring $R_t = R/qR$. Further, when the standard deviation of a discrete Gaussian distribution that provides noise is $\sigma$, let $\chi = D_{Z^n, \sigma}$ be an element of the ring R where each coefficient follows a discrete Gaussian distribution with mean 0 and variance $\sigma^2$. Also, let w be floor(q/t), where "floor" is the floor function.

Keys are generated as follows. Sample s, e according with the distribution $\chi$ (s, $e \leftarrow \chi$) and generate $p_1 \in R_q$ uniformly at random. Using these, we define a public key as $pk=(p_0, p_1)=(-(p_1 s+e), p_1) \in (R_q)^2$ and a secret key as sk=s.

Then, encryption is performed as follows. Generate u, f, $g \leftarrow \chi$ according with the distribution $\chi$ for a plaintext $m \in R_q$ and the public key $pk=(p_0, p_1)$, and construct a ciphertext $ct=(c_0, c_1)=(p_0 u+g+wm, p_1 u+tf) \in (R_q)^2$.

For the ciphertext thus defined, homomorphic addition and homomorphic multiplication are defined.

Homomorphic Addition: For ciphertexts ct and ct', homomorphic addition ct'' is defined as follows:

[Math. 6]

$$ct = (c_0, c_1, \ldots, c_\xi), ct' = (c_0', c_1', \ldots, c_\eta')$$

$$ct''(z) = ct(z) + ct'(z) = \sum_{i=0}^{max(\xi, \eta)} (c_i + c_i') z^i \in (R_q)^{max(\xi, \eta)}$$

Homomorphic Multiplication: For the ciphertexts ct and ct', homomorphic multiplication ct'' is defined as follows. Note that $(c_0 c_0', c_0 c_1' + c_0' c_1, c_1 c_1')$ when $ct=(c_0, c_1)$, $ct'=(c_0', c_1')$. It is important to note that performing homomorphic multiplication increases the elements of the ciphertext.

[Math. 7]

$$ct = (c_0, c_1, \ldots, c_\xi), ct' = (c_0', c_1', \ldots, c_\eta')$$

$$ct''(z) = \left\lfloor \left(\frac{t}{q}\right) ct(z) + ct'(z) \right\rfloor = \left\lfloor \left(\frac{t}{q}\right) \left(\sum_{i=0}^{\xi} c_i z^i\right) \left(\sum_{i=0}^{\eta} c_i' z^i\right) \right\rfloor \in (R_q)^{\xi+\eta+1}$$

Meanwhile, the ciphertext above can be decrypted by performing the following process:

Decryption: The ciphertext ct can be decrypted into the plaintext m as follows.

[Math. 8]

$$ct = (c_0, c_1, \ldots, c_\xi)$$

$$m = \left\lfloor \frac{t}{q} ct(s) \right\rceil = \left\lfloor \frac{t}{q} \sum_{i=0}^{\xi} c_i s^i \right\rceil \in R_t$$

where $\lfloor \cdot \rceil$ represents rounding to the nearest integer. $ct(s) = c_0 + c_1 s$ when $ct=(c_0, c_1)$, and $ct(s) = c_0 + c_1 s + c_2 s^2$ when $ct=(c_0, c_1, c_2)$.

Figure 6:
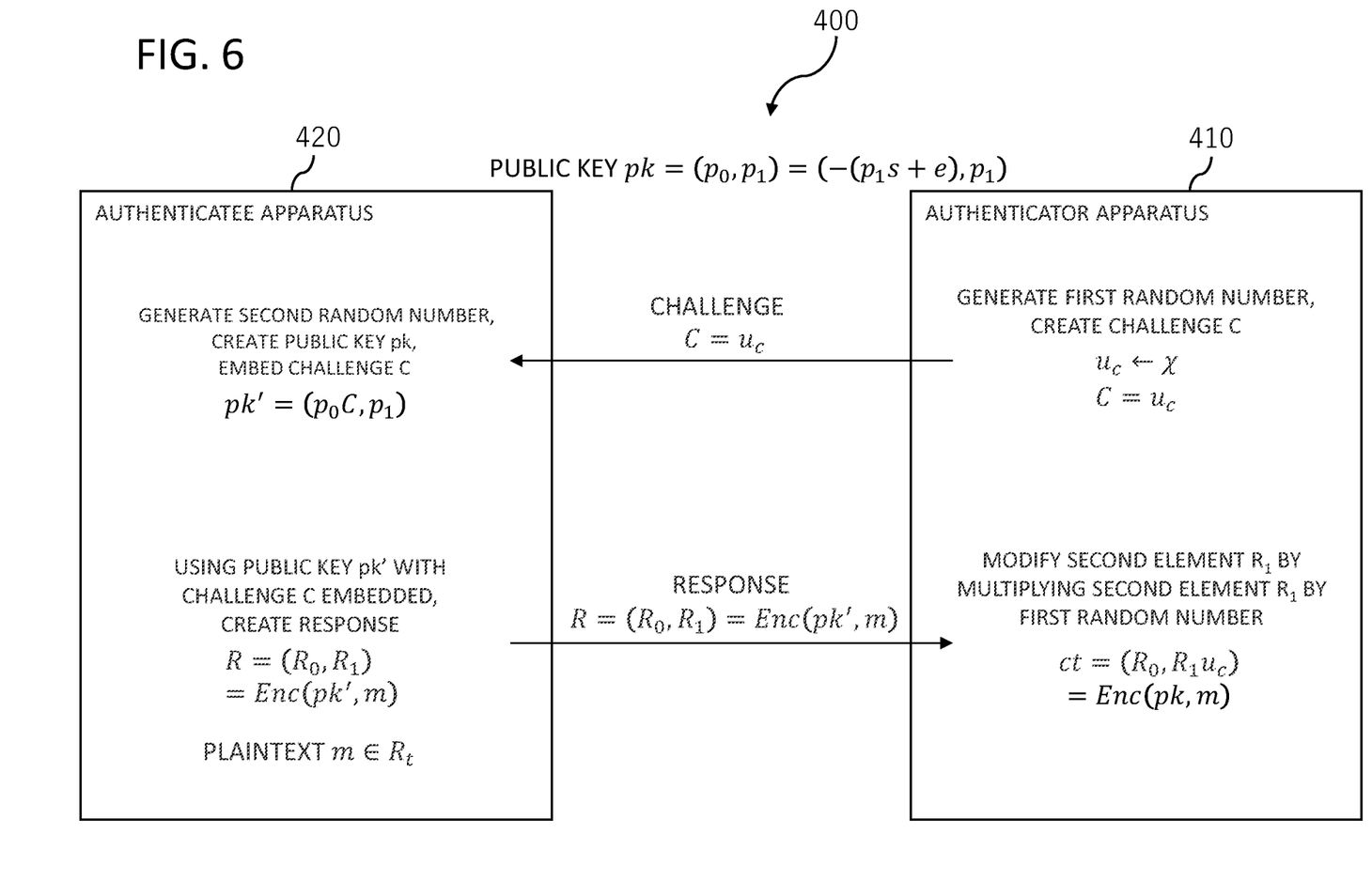
FIG. 6 is a drawing showing a schematic configuration of an authentication system relating to a fourth example embodiment.

FIG. 6 is a drawing showing a schematic configuration of an authentication system relating to the fourth example embodiment. The authentication system 400 relating to the fourth example embodiment shown in FIG. 6 uses the BFV encryption scheme. As shown in FIG. 6, the authentication system 400 comprises an authenticator apparatus 410 and an authenticatee apparatus 420, and transmits a ciphertext of authentication information from the authenticatee apparatus 420 to the authenticator apparatus 410 using homomorphic encryption with a public key encryption scheme.

The authenticator apparatus 410 generates a first random number ($u_c \leftarrow \chi$) and creates a challenge $C = u_c$ using this first random number. Then, the authenticator apparatus 410 transmits the challenge $C = u_c$ to the authenticatee apparatus 420.

Meanwhile, the authenticatee apparatus 420 generates a second random number and creates a public key pk using this second random number. Here, the public key pk is pk=($p_0$, $p_1$)=(−($p_1$s+e), $p_1$)∈($R_q$)$^2$ as defined in the BFV encryption scheme. Then, the authenticatee apparatus 420 embeds the challenge C=$u_c$ received from the authenticator apparatus 410 into the public key pk to create a pseudo public key pk'=($p_0$C, $p_1$).

The authenticatee apparatus 420 pseudo-encrypts a plaintext m∈$R_t$ using the pseudo public key pk'=($p_0$C, $p_1$) with the challenge C=$u_c$ embedded therein. Here, pseudo-encryption means performing the same process of encryption as in the normal BFV encryption scheme using the pseudo public key pk'=($p_0$C, $p_1$) with the challenge C=$u_c$ embedded therein. In other words, the authenticatee apparatus 420 calculates a response R=($R_0$, $R_1$)=Enc(pk', m). Then, the authenticatee apparatus 420 transmits this response R=($R_0$, $R_1$)=Enc(pk', m) to the authenticator apparatus 410.

The authenticator apparatus 410 receives the response R=($R_0$, $R_1$)=Enc(pk', m) from the authenticatee apparatus 420. As stated above, since this was created with the pseudo public key pk'=($p_0$C, $p_1$), it is not a direct ciphertext of the plaintext m∈$R_t$. Then, the authenticator apparatus 410 modifies the second element $R_1$ of the received response R=($R_0$, $R_1$) to obtain a ciphertext of the plaintext m∈$R_t$.

More concretely, the authenticator apparatus 410 multiplies the second element $R_1$ of the received response R=($R_0$, $R_1$) by the first random number $u_c$. ct=($R_0$, $R_1$ $u_c$) obtained by multiplying the second element $R_1$ by the first random number $u_c$ matches the ciphertext obtained by encrypting the plaintext m∈$R_t$ using the public key pk=($p_0$, $p_1$)=(−($p_1$s+e), $p_1$). This can be confirmed by performing the following calculations:

[Math. 9]

$$R_0 = p_0 Cu + g + wm = p_0 u_c u + g + wm = p_0 u_c u + g + wm = p_0 u' + g + wm$$

$$R_1 u_c = (p_1 u + f) u_c = p_1 u_c u + f u_c = p_1 u' + f'$$

$$\therefore ct = Enc(pk, m)$$

As described, through the exchange of challenge-response, it becomes possible for the authenticator apparatus 410 to have a ciphertext of authentication information transmitted from the authenticatee apparatus 420 to the authenticator apparatus 410. Further, as in the second example embodiment using the BGV encryption scheme, the authentication system 400 relating to the fourth example embodiment provides security against replay attacks.

Fifth Example Embodiment

Figure 7:
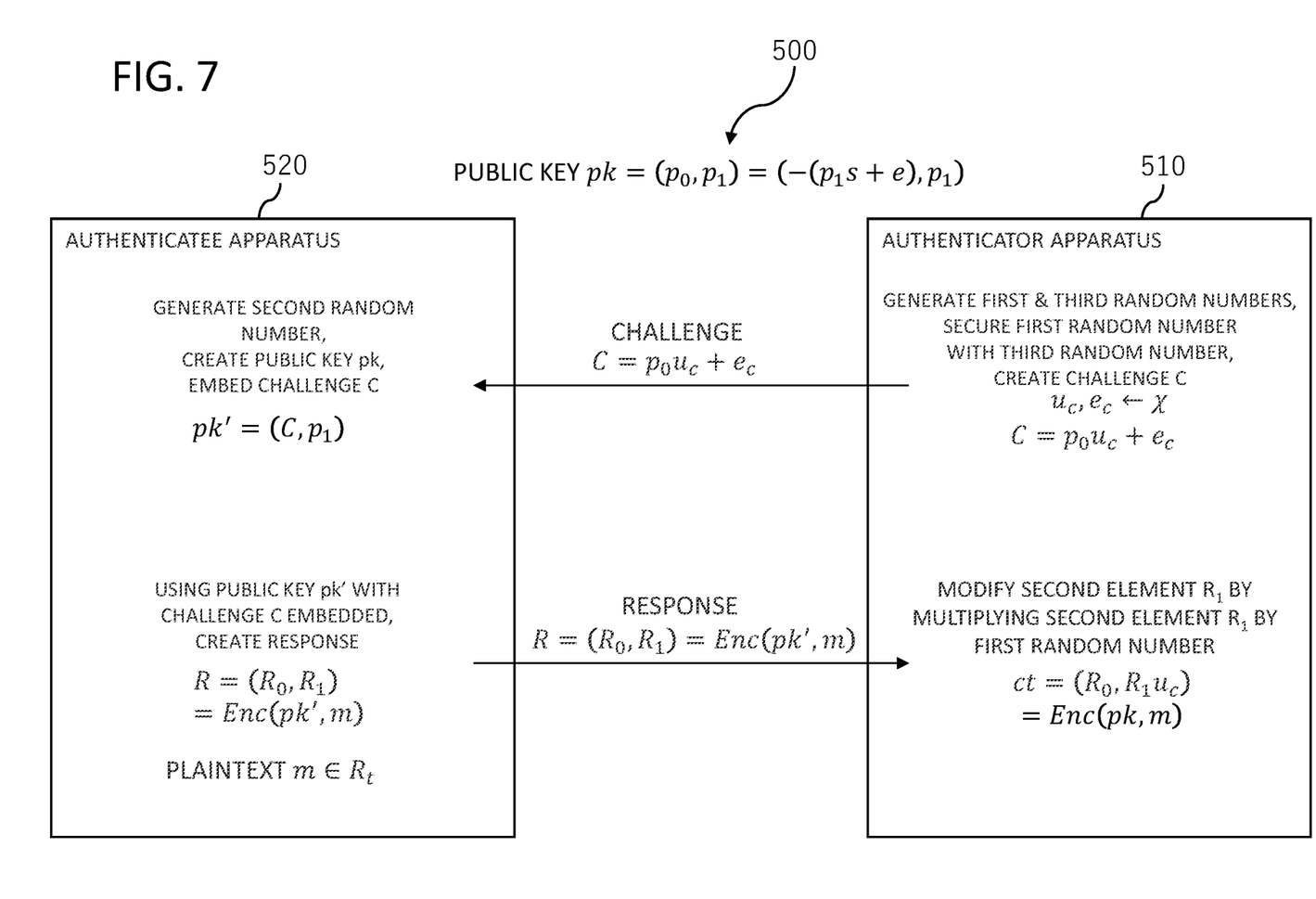
FIG. 7 is a drawing showing a schematic configuration of an authentication system relating to a fifth example embodiment.

FIG. 7 is a drawing showing a schematic configuration of an authentication system relating to a fifth example embodiment. In the authentication system 500 relating to the fifth example embodiment shown in FIG. 7, a configuration to secure the first random number is added to the fourth example embodiment using the BFV encryption scheme. As shown in FIG. 7, the authentication system 500 comprises an authenticator apparatus 510 and an authenticatee apparatus 520, and transmits a ciphertext of authentication information from the authenticatee apparatus 520 to the authenticator apparatus 510 using homomorphic encryption with a public key encryption scheme.

The authenticator apparatus 510 generates first and third random numbers ($u_c$, $e_c$←χ) and secures the first random number using the third random number to create a challenge C=$p_0 u_c$+$e_c$. Then, the authenticator apparatus 510 transmits the challenge C=$p_0 u_c$+$e_c$ to the authenticatee apparatus 520.

Meanwhile, the authenticatee apparatus 520 generates a second random number and creates a public key pk using this second random number. Here, the public key pk is pk=($p_0$, $p_1$)=(−($p_1$s+e), $p_1$)∈($R_q$)$^2$ as defined in the BFV encryption scheme. Then, the authenticatee apparatus 520 embeds the challenge C=$p_0 u_c$+$e_c$ received from the authenticator apparatus 510 into the public key pk to create a pseudo public key pk'=(C, $p_1$).

The authenticatee apparatus 520 pseudo-encrypts a plaintext m∈$R_t$ using the pseudo public key pk'=(C, $p_1$) with the challenge C=$p_0 u_c$+$e_c$ embedded therein. Here, pseudo-encryption means performing the same process of encryption as in the normal BFV encryption scheme using the pseudo public key pk'=(C, $p_1$) with the challenge C=$p_0 u_c$+$e_c$ embedded therein. In other words, the authenticatee apparatus 520 calculates a response R=($R_0$, $R_1$)=Enc(pk', m). Then, the authenticatee apparatus 520 transmits this response R=($R_0$, $R_1$)=Enc(pk', m) to the authenticator apparatus 510.

The authenticator apparatus 510 receives the response R=($R_0$, $R_1$)=Enc(pk', m) from the authenticatee apparatus 520. As stated above, since this was created with the pseudo public key pk'=(C, $p_1$), it is not a direct ciphertext of the plaintext m∈$R_t$. Then, the authenticator apparatus 510 modifies the second element $R_1$ of the received response R=($R_0$, $R_1$) to obtain a ciphertext of the plaintext m∈$R_t$.

More concretely, the authenticator apparatus 510 multiplies the second element $R_1$ of the received response R=($R_0$, $R_1$) by the first random number $u_c$. ct=($R_0$, $R_1$ $u_c$) obtained by multiplying the second element $R_1$ by the first random number $u_c$ matches the ciphertext obtained by encrypting the plaintext m∈$R_t$ using the public key pk=($p_0$, $p_1$)=(−($p_1$s+e), $p_1$). This can be confirmed by performing the following calculations:

[Math. 10]

$$R_0 = Cu + g + wm =$$
$$(p_0 u_c + e_c)u + g + wm = p_0 u_c u + e_c u + g + wm = p_0 u' + g' + wm$$

$$R_1 u_c = (p_1 u + f) u_c = p_1 u_c u + f u_c = p_1 u' + f'$$

$$\therefore ct = Enc(pk, m)$$

As described, through the exchange of challenge-response, it becomes possible for the authenticator apparatus 510 to have a ciphertext of authentication information transmitted from the authenticatee apparatus 520 to the authenticator apparatus 510. Further, as in the third example embodiment using the BGV encryption scheme, the authentication system 500 relating to the fifth example embodiment provides security against replay attacks.

[Comparison of Computational Complexity and Communication Volume]

The following describes the differences between the example embodiments of the present invention and a conventional technology in terms of computational complexity and communication volume. The technique described in Patent Literature 1 cited above will be examined here as the conventional technology and a comparative example. Table 1 below compares the comparative example and the second and the third example embodiments in terms of computational complexity. Further, Table 2 below compares the comparative example and the second and the third example embodiments in terms of communication volume.

TABLE 1

| Method | Challenge | | | Response | | | Response Processing | | |
|---|---|---|---|---|---|---|---|---|---|
| | Additions over $R_q$ | Multiplications over $R_q$ | Sampling from $\chi$ | Additions over $R_q$ | Multiplications over $R_q$ | Sampling from $\chi$ | Additions over $R_q$ | Multiplications over $R_q$ | Sampling from $\chi$ |
| Comparative Example | 3 | 2 | 2 | 7 | 5 | 4 | 3 | 3 | 2 |
| $2^{nd}$ Example Embodiment | 0 | 0 | 1 | 3 | 3 | 2 | 0 | 1 | 0 |
| $3^{rd}$ Example Embodiment | 1 | 1 | 1 | 3 | 2 | 2 | 0 | 1 | 0 |

TABLE 2

| Method | Challenge (# of elements in $R_q$) | Response (# of elements in $R_q$) | Ciphertext after challenge-response (# of elements in $R_q$) |
|---|---|---|---|
| Comparative Example | 2 | 3 | 4 |
| $2^{nd}$ Example Embodiment | 1 | 2 | 2 |
| $3^{rd}$ Example Embodiment | 1 | 2 | 2 |

As can be seen from Tables 1 and 2 above, the example embodiments of the present invention require less computational complexity and communication volume compared to the comparative example. This is not just a matter of reduced computational complexity and communication volume relative to a particular comparative example. The fact that the challenge is embedded in the public key rather than in the plaintext in the example embodiments of the present invention contributes to these reductions. If the challenge is embedded in the plaintext, a homomorphic operation must be performed to manipulate the challenge stored in the ciphertext. Generally, however, homomorphic operations are computationally and communicationally intensive. Meanwhile, the example embodiments of the present invention embed the challenge in the public key, allowing processing to be carried out using normal ring operations. In particular, the amount of calculation required to modify a received response to a normal ciphertext is very light since it is only a matter of multiplying the second element by the first random number.

Application Example Embodiment

Figure 8:
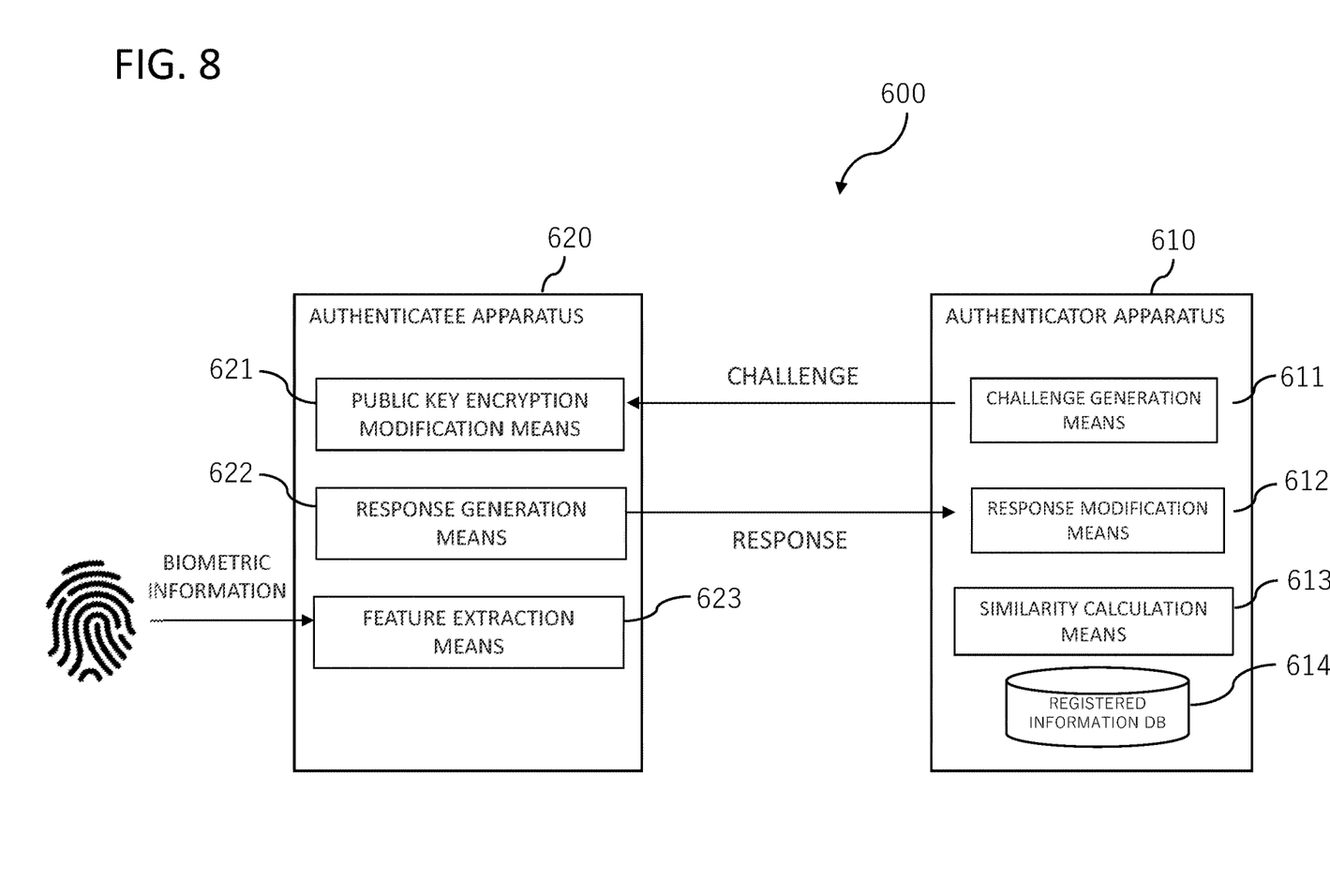
FIG. 8 is a drawing showing a schematic configuration of an example embodiment in which the present invention is applied to biometric authentication.

FIG. 8 is a drawing showing a schematic configuration of an example embodiment in which the present invention is applied to biometric authentication. As shown in FIG. 8, an authentication system 600 comprises an authenticator apparatus 610 and an authenticatee apparatus 620, and transmits a ciphertext of a feature of biometric information from the authenticatee apparatus 620 to the authenticator apparatus 610 using homomorphic encryption with a public key encryption scheme.

The authenticator apparatus 610 comprises challenge generation means 611, response modification means 612, similarity calculation means 613, and a registered information DB 614. Meanwhile, the authenticatee apparatus 620 comprises public key encryption modification means 621, response generation means 622, and feature extraction means 623.

We will consider a case where the authenticatee apparatus 620 transmits a feature of biometric information to the authenticator apparatus 610. Biometric information typically includes, for instance, fingerprints and palm prints, but it may also include voiceprints. Since features of biometric information, such as fingerprints and palm prints, require advanced and complete management, they are expected to be transmitted from the authenticatee apparatus 620 to the authenticator apparatus 610 in encrypted form. Data stored in the registered information DB 614 of the authenticator apparatus 610 are also encrypted. Further, the calculation of the similarity between a feature of biometric information transmitted from the authenticatee apparatus 620 and a feature of biometric information stored in the registered information DB 614 is also performed in encrypted form. The authentication system 600 functions suitably in such an application.

In other words, the challenge generation means 611 generates a challenge including a first random number and transmits the challenge to the authenticatee apparatus 620. Then, the public key encryption modification means 621 generates a second random number and modifies a public key using the second random number by embedding the challenge therein. The response generation means 622 encrypts a feature of biometric information using the pseudo public key modified by embedding the challenge therein, and transmits this ciphertext to the authenticator apparatus 610. The authenticator apparatus 610 obtains a ciphertext of the feature of the biometric information by modifying the received response using the first random number.

By transmitting a feature of biometric information from the authenticatee apparatus 620 to the authenticator apparatus 610 as described, the security against replay attacks is enhanced. Applying the example embodiments of the present invention to biometric authentication is a suitable use case.

Further, the disclosure of Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literatures cited above as necessary, in combination with the matters described herein, as part of the disclosure of the present invention in accordance with the object thereof shall be considered to be included in the disclosed matters of the present application.

REFERENCE SIGNS LIST

10: hardware configuration
11: CPU
12: primary storage device
13: auxiliary storage device
14: IF part
100, 200, 300, 400, 500, 600: authentication system
110, 210, 310, 410, 510, 610: authenticator apparatus
120, 220, 320, 420, 520, 620: authenticatee apparatus
611: challenge generation means
612: response modification means
613: similarity calculation means
614: registered information DB
621: public key encryption modification means
622: response generation means
623: feature extraction means

What is claimed is:

1. An authentication system transmitting a ciphertext of authentication information from an authenticatee apparatus to an authenticator apparatus using homomorphic encryption with a public key encryption scheme, wherein
the authenticator apparatus issues a first random number to the authenticatee apparatus,
the authenticatee apparatus generates a second random number and transmits to the authenticator apparatus a first element generated with a public key using the first and the second random numbers and a second element generated with a public key using the second random number, and
the authenticator apparatus modifies the second element using the first random number to obtain a ciphertext of the authentication information.

2. The authentication system according to claim 1, wherein
the authenticator apparatus modifies the second element by multiplying the second element by the first random number.

3. The authentication system according to claim 1, wherein
the authenticator apparatus transmits the first random number to the authenticatee apparatus in a secured form.

4. The authentication system according to claim 3, wherein
the secured form uses a third random number.

5. The authentication system according to claim 1, wherein
the public key encryption scheme is the BGV scheme.

6. The authentication system according to claim 1, wherein
the public key encryption scheme is the BFV scheme.

7. An authenticatee apparatus transmitting to an authenticator apparatus a ciphertext of authentication information using homomorphic encryption with a public key encryption scheme, wherein
the authenticatee apparatus receives a first random number from the authenticator apparatus, generates a second random number, and transmits to the authenticator apparatus a pair of a first element generated with a public key using the first and the second random numbers and a second element generated with a public key using the second random number so that the authenticator apparatus obtains a ciphertext of the authentication information by modifying the second element using the first random number.

8. An authenticator apparatus receiving from an authenticatee apparatus a ciphertext of authentication information using homomorphic encryption with a public key encryption scheme, wherein
the authenticator apparatus issues a first random number to the authenticatee apparatus, which generates a second random number, receives from the authenticatee apparatus a first element generated with a public key using the first and the second random numbers and a second element generated with a public key using the second random number, and modifies the second element using the first random number to obtain a ciphertext of the authentication information.

9. An authentication method transmitting a ciphertext of authentication information from an authenticatee apparatus to an authenticator apparatus using homomorphic encryption with a public key encryption scheme, the authentication method including:
having the authenticator apparatus issue a first random number to the authenticatee apparatus;
having the authenticatee apparatus generate a second random number and transmit to the authenticator apparatus a first element generated with a public key using the first and the second random numbers and a second element generated with a public key using the second random number; and
having the authenticator apparatus modify the second element using the first random number to obtain a ciphertext of the authentication information.

10. A non-transient computer readable medium storing an authentication program transmitting a ciphertext of authentication information from an authenticatee apparatus to an authenticator apparatus using homomorphic encryption with a public key encryption scheme, the authentication program including:
having the authenticator apparatus issue a first random number to the authenticatee apparatus;
having the authenticatee apparatus generate a second random number and transmit to the authenticator apparatus a first element generated with a public key using the first and the second random numbers and a second element generated with a public key using the second random number; and
having the authenticator apparatus modify the second element using the first random number to obtain a ciphertext of the authentication information.

11. The authenticatee apparatus according to claim 7, wherein
the authenticator apparatus modifies the second element by multiplying the second element by the first random number.

12. The authenticatee apparatus according to claim 7, wherein
the authenticator apparatus transmits the first random number to the authenticatee apparatus in a secured form.

13. The authenticatee apparatus according to claim 12, wherein
the secured form uses a third random number.

14. The authenticator apparatus according to claim 8, wherein
the authenticator apparatus modifies the second element by multiplying the second element by the first random number.

15. The authenticator apparatus according to claim 8, wherein
the authenticator apparatus transmits the first random number to the authenticatee apparatus in a secured form.

16. The authenticator apparatus according to claim 15, wherein
the secured form uses a third random number.

17. The authentication method according to claim 9, including:
having the authenticator apparatus modify the second element by multiplying the second element by the first random number.

18. The authentication method according to claim 9, including:
having the authenticator apparatus transmit the first random number to the authenticatee apparatus in a secured form.

19. The authentication method according to claim 18, wherein
the secured form uses a third random number.

20. The non-transient computer readable medium storing the authentication program according to claim 10, the authentication program including:
having the authenticator apparatus modify the second element by multiplying the second element by the first random number.

21. The non-transient computer readable medium storing the authentication program according to claim 10, the authentication program including:
having the authenticator apparatus transmit the first random number to the authenticatee apparatus in a secured form.

22. The non-transient computer readable medium storing the authentication program according to claim 21, wherein
the secured form uses a third random number.

* * * * *